US005786030A

United States Patent [19]

Ahmed et al.

[11] Patent Number: 5,786,030
[45] Date of Patent: Jul. 28, 1998

[54] SPOTTING RESISTANT GLOSS ENHANCEMENT OF AUTODEPOSITION COATING

[75] Inventors: Bashir M. Ahmed, Utica; Douglas A. Brown, Troy; William E. Fristad, Rochester Hills, all of Mich.

[73] Assignee: Henkel Corporation, Plymouth Meeting, Pa.

[21] Appl. No.: 745,550

[22] Filed: Nov. 12, 1996

[51] Int. Cl.$^6$ .................. B05D 3/10; B05D 7/14
[52] U.S. Cl. .................. 427/353; 106/14.13; 106/14.15; 427/352; 427/388.4; 427/435; 427/341
[58] Field of Search .................. 427/345, 388.4, 427/435, 443.1, 353, 352, 341, 337; 510/210, 241; 106/14.13, 14.15, 14.14, 14.16; 148/243, 252, 256, 257, 265

[56] References Cited

U.S. PATENT DOCUMENTS

| Re. 30,714 | 8/1981 | Harriman et al. | 134/2 |
|---|---|---|---|
| 2,726,175 | 12/1955 | Kendall et al. | 427/436 |
| 3,095,309 | 6/1963 | Zeblisky | 427/436 |
| 3,444,007 | 5/1969 | Maurer et al. | |
| 3,889,017 | 6/1975 | Franz et al. | 427/305 |
| 3,929,514 | 12/1975 | Houlihan et al. | 148/6.14 |
| 4,303,704 | 12/1981 | Courduvelis et al. | 427/345 |
| 4,496,470 | 1/1985 | Kapiloff et al. | 510/263 |
| 4,636,264 | 1/1987 | Schellenberg et al. | 427/435 |
| 4,647,480 | 3/1987 | Ahmed | 427/388.4 |
| 4,800,106 | 1/1989 | Broadbent | 427/388.1 |
| 5,248,525 | 9/1993 | Siebert | 427/443.1 |
| 5,342,694 | 8/1994 | Ahmed et al. | 427/443.1 |

*Primary Examiner*—Diana Dudash
*Attorney, Agent, or Firm*—Wayne C. Jaeschke; Norvell E. Wisdom, Jr.; Frank E. Robbins

[57] ABSTRACT

A reaction rinse containing strong alkali, betaine surfactants, and a complexing agent for iron enhances the gloss of a dried and cured autodeposited coating that is contacted with the reaction rinse while still wet, particularly if the autodeposited coating consists predominantly of a copolymer of vinylidene chloride.

20 Claims, No Drawings

SPOTTING RESISTANT GLOSS ENHANCEMENT OF AUTODEPOSITION COATING

BACKGROUND OF THE INVENTION

1. Field of the Invention

This invention relates to a composition and process for enhancing the gloss of, while achieving good corrosion resistance of, a surface coating formed by a process known as autodeposition, in which a protective coating forms on the surface of a suitable substrate, usually a metal, that is contacted with the composition, without the need for any external electromotive force such as is used for plating one metal with another and for cathodically deposited paints, and the thickness of this protective coating continues to increase with time as long as contact is maintained.

2. Statement of Related Art

This invention is an improvement of the invention described and claimed in U.S. Pat. No. 4,800,106 of Jan. 24, 1989 to Broadbent, the entire specification of which, except for Examples II–IV, the claims, and any part that may be inconsistent with any explicit statement herein, is hereby incorporated herein by reference. The examples of rinses for autodeposited coatings shown in the Broadbent reference proved to be unsatisfactory in most commercial applications because of a tendency, discovered after the filing of the application on which the Broadbent patent was granted, to develop spotty blemishes on the generally glossy surfaces that these rinses promoted, after the rinsing compositions had been used for long periods, even though they produced unblemished glossy surfaces when freshly prepared.

DESCRIPTION OF THE INVENTION

1. Object of the Invention

The major object of this invention was to achieve autodeposited surface coatings that, after drying and curing, were highly glossy, preferably at least as glossy as those achieved by using the rinses for the wet autodeposited coating exemplified in the Broadbent patent, but without spotty blemishing and without unduly diminishing corrosion resistance.

2. General Principles of Description

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the specification, unless expressly stated to the contrary: percent, "parts of", and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole; any counterions thus implicitly specified should preferably be selected from among other constituents explicitly specified in ionic form, to the extent possible; otherwise such counterions may be freely selected, except for avoiding counterions that act adversely to the object(s) of the invention; the terms "molecule" and "mole" and their grammatical variations may be applied to ionic, elemental, or any other type of chemical entities defined by the number of atoms of each type present therein, as well as to substances with well-defined neutral molecules; the first definition of an acronym or other abbreviation applies to all subsequent uses herein of the same abbreviation and applies mutatis mutandis to normal grammatical variations of the initially defined abbreviation; the term "paint" includes all like materials that may be designated by more specialized terms such as lacquer, enamel, varnish, shellac, and the like; and the term "polymer" includes "olgomer", "homopolymer", "copolymer", "terpolymer", and the like.

SUMMARY OF THE INVENTION

A composition according to this invention is an aqueous liquid composition comprising, preferably consisting essentially of, or still more preferably consisting of, water and:

(A) an amount of a component of dissolved alkaline material;

(B) an amount of a component of amphoteric and/or zwitterionic surfactant molecules, exclusive of any that constitute part of component (A); and (C) an amount of a component of dissolved molecules that are complexing agents for ferrous and/or ferric ions but are not part of one of the previously recited components, said complexing agents being selected from the group consisting of organic molecules that comprise both (1) at least one hydroxyl moiety and (2) at least one additional moiety selected from the group consisting of hydroxyl, carboxyl, carboxylate, and amino moieties, moieties (1) and (2) being present in said organic molecules in positions such that the oxygen atom in hydroxyl moiety (1) and the amino nitrogen atom or a non-carbonyl oxygen atom in moiety (2) can, together with the other atoms of the organic molecule and a metal atom to which said oxygen atom in hydroxyl moiety (1) and said amino nitrogen atom or non-carbonyl oxygen atom in moiety (2) are coordinatively bonded, form a five- or six-atom-membered ring[1];

[1] This condition is equivalent to a condition that, in hypothetically following a path within said organic molecule between the atoms thereof along the valence bonds between these atoms, there exists at least one such path within the molecule that has (i) the oxygen atom of moiety (1) on one end of the path, (ii) an nitrogen atom or non-carbonyl oxygen atom of moiety (2) on the other end of the path, and (iii) either three other atoms of the molecule constituting the middle atoms of the path.

and, optionally, one or both of the following components:

(D) an amount of a component selected from the group consisting of organic amine molecules, exclusive of any that constitute part of one of the previously recited components; and (E) an amount of a component selected from the group consisting of organic acids and their salts, exclusive of any that constitute part of one of the previously recited components.

Such a composition according to the invention may be ready for immediate use, in which instance it may be called a "working composition", or it may be more suitable for dilution with water to form such a working composition, in which instance the original composition may be called a "concentrate", "concentrate composition", or "concentrated composition", all three of which terms are considered equivalent in meaning herein. Some compositions according to the invention may, of course, be suitable for both uses.

A process according to this invention comprises at a minimum a step of contacting a wet autodeposited coating on a substrate with a volume of a composition according to the invention for a sufficient time to remove some iron cations from the wet autodeposited coating into the volume of composition according to the invention and thereafter separating the thus contacted volume of composition according to the invention from the wet autodeposited coating before drying the latter.

A process according to the invention also may, and usually preferably does, include other steps that are conventional per se, both before and after the minimum two steps according to the invention noted in the preceding paragraph. These steps may include, e.g., (i) precleaning a metal substrate, (ii) forming the wet autodeposited coating to be treated according to the invention, (iii) rinsing a still wet autodeposited coating with water before and/or after contact and separation from contact of a composition according to the invention from the initially formed wet autodeposited coating, and (iv) drying and curing a rinsed coating to form an adherent dry coating.

DESCRIPTION OF PREFERRED EMBODIMENT OF THE INVENTION

For various reasons, it is often preferred that compositions according to the invention be substantially free from various constituents that can cause practical difficulties when present. More particularly, with increasing preference in the order given and with independent preference for each noted component, compositions according to the invention preferably contain no more than 4.0 2.2, 0.90, 0.50, 0.20, 0.12, 0.070, 0.030, 0.010, 0.0050, 0.0020, 0.0010, 0.00050, 0.00020, or 0.00010 grams of constituent per kilogram of total composition (hereinafter usually abbreviated as "g/kg") of any of the following: cations selected from the group consisting of $Zn^{+2}$, $Ni^{+2}$, $Mn^{+2}$, $Co^{+2}$, $Cu^{+2}$, $Fe^{+2}$, $Ca^{+2}$, $Mg^{+2}$, and all metal cations with a valence of 3 or higher; sulfate, chloride, bromide, iodide, nitrate, and phosphate anions; and any complexing agents for iron cations that are not part of component (C) as defined above.

Preferred sources for alkaline material component (A) as described above are ammonium and alkali metal hydroxides, although carbonates and other alkali metal salts of weak acids can also be used if soluble in sufficient quantity. It has been found, unexpectedly, that if all of the cations present in a composition according to the invention are ammonium, the gloss of the coatings is less than if at least some alkali metal ions are present. Either of the two less expensive alkali metal cations, sodium and potassium, if used alone can produce unspotted glossy coatings, but if only sodium cations are used, considerably more rinsing is required to prevent blistering of the autodeposited coating during drying and curing. Any such blistering reduces corrosion resistance of the coated metal. Potassium cations can be satisfactorily used with less rinsing and are therefore most preferred.

In a concentrate according to the invention, the total amount of alkaline material, measured as its stoichiometric equivalent as hydroxide ions (whether or not in fact fully ionized in the composition), preferably is at least, with increasing preference in the order given, 0.20, 0.40, 0.60, 0.80. 1.0, 1.2, 1.4, 1.6, 1.8, or 2.0 moles per kilogram of total composition (hereinafter usually abbreviated as "M/kg") and independently, primarily for reasons of storage stability, preferably is not more than, with increasing preference in the order given, 3.0, 2.5, or 2.2 M/kg.

In a working composition according to the invention, pH values are more useful than alkali material concentrations in specifying preferences; the pH of a working composition according to the invention preferably is at least, with increasing preference in the order given, 9.0, 9.5, 10.0, 10.4, 10.6, 10.8, 11.0, 11.2, 11.4, 11.6, 11.8, or 12.0 and independently, primarily for reasons of economy and/or storage stability, preferably is not more than, with increasing preference in the order given, 14.0, 13.6, 13.3, 13.0, 12.8, 12.70, 12.60, 12.50, 12.40, 12.30, 12.20, or 12.10.

For surfactant component (B) as described above, preferred constituents are betaine and/or amidobetaine surfactants, a preferred group being those described with chemical formulas in column 3 lines 23–49 of the above noted U.S. Pat. No. 4,800,106, except that "R" need not be derived from natural coconut oil as described in U.S. Pat. No. 4,800,106; instead R represents an aliphatic monovalent hydrocarbon moiety that may be saturated or unsaturated, preferably saturated; may be branched or straight chain, preferably the latter; and has a number of carbon atoms that preferably is at least, with increasing preference in the order given, 3, 5, 7, 8, 9, 10, 11, or 12 and independently preferably is not more than, with increasing preference in the order given, 30, 28, 26, 24, or 22 and for reasons of economy with little if any sacrifice in performance quality more preferably is not more than, with increasing preference in the order given, 20, 18, 16, 14, or 13.

In a composition according to the invention, the amount of component (B), measured in g/kg, preferably has a ratio to the amount of component (A), measured as described above, that is at least, with increasing preference in the order given, 1.5:1.0, 3.0:1.0, 5.0:1.0, 7.0:1.0, 9.0:1.0, 11.0:1.0, 12.0:1.0, 12.5:1.0, or 13.0:1.0 and independently preferably is not more than, with increasing preference in the order given, 60:1.0, 45:1.0, 30:1.0, 24:1.0, 21:1.0, 19:1.0, 17:1.0, 15:1.0, or 13.5:1.0. In a concentrate composition according to the invention, the concentration of component (B) preferably is at least, with increasing preference in the order given, 3.0, 6.0, 9.0, 12, 15, 18, 20, 22.0, 24.0, 26.0, or 27.0 g/kg and independently, primarily for reasons of economy, preferably is not more than, with increasing preference in the order given, 45, 42, 39, 36, 33.0, 31.5, 30.0, 29.0, or 28.0 g/kg.

Component (C) preferably includes at least one, and more preferably both, of a subcomponent[2] (C.1) selected from the group consisting of hydroxy acids, their salts, and lactones that readily hydrolyze in water to produce hydroxy acids and a subcomponent (C.2) selected from the group consisting of aminines that conform to the general formula $NR'_x(C_yH_{2y}OH)_{3-x}$, where R' represents a hydrogen moiety or alkyl moiety, x represents an integer from 0 to 2, preferably not more than 1, most preferably 0; y represents a positive integer that may be the same or different from one $C_yH_2OH$ moiety to another, independently is preferably not less than 2, and independently preferably is not more than, with increasing preference in the order given, 4, 3, or 2.

[2]The word "subcomponent" does not imply that a material so designated can not constitute all of a component of which it is a subcomponent.

A group consisting of gluconic and heptogluconic acids, glucono delta-lactone, citric acid, tartaric acid, and malic acid and all of their water soluble salts are especially preferred for subcomponent (C.1), with gluconic acid most preferred. In a concentrate according to the invention, it is preferred that the total concentration, measured as its stoichiometric equivalent as free hydroxyacid, of subcomponent (C.1), be at least, with increasing preference in the order given, 0.50, 1.0, 2.0, 3.0, 4.0, 5.0, 6.0, 7.0, 8.0, 9.0, 10.0, 11.0, 12.0, 13.0, or 13.7 g/kg and independently, primarily for reasons of economy, preferably be not more than, with increasing preference in the order given, 45, 40, 35, 30, 25, 20, 18, 17.0, 16.5, 16.0, 15.5, 15.0, 14.5, or 14.0 g/kg. Independently, for both working and concentrate compositions according to the invention, the amounts of subcomponent (C.1) and component (B), both measured as described above, preferably are such as to have a ratio of subcomponent (C.1) to component (B) that is not less than, with increasing preference in the order given, 0.050:1.0, 0.10:1.0, 0.15:1.0, 0.20:1.0, 0.25:1.0, 0.30:1.0, 0.35:1.0, 0.40:1.0, 0.44:1.0, 0.47:1.0, or 0.49:1.0 and independently preferably is not more than, with increasing preference in the order given, 3.3:1.0, 2.5:1.0, 2.10:1.0, 1.85:1.0, 1.60:1.0, 1.35:1.0, 1.15:1.0, 0.95:1.0, 0.75:1.0, 0.65:1.0, 0.55:1.0, 0.61:1.0, 0.57:1.0, 0.53:1.0, or 0.51:1.0.

Optional organic amine subcomponent (C.2) preferably is present in compositions according to the invention in a concentration that is at least, with increasing preference in the order given, 2.0, 4.0, 6.0, 8.0, 10.0, 12.0, 14.0, 16.0, 18.0, 19.0, 20.0, or 21.0 g/kg and independently, at least for reasons of economy, preferably is not more than, with increasing preference in the order given, 100, 75, 60, 50, 45, 40, 35, 30, 25, or 23 g/kg. Independently, for both working and concentrate compositions according to the invention, the concentration of subcomponent (C.2) preferably has a ratio to the concentration of component (B), both concentrations being measured in the same units, that is at least, with increasing preference in the order given, 0.067:1.0, 0.17:1.0, 0.27:1.0, 0.37:1.0, 0.47:1.0, 0.53:1.0, 0.60:1.0, 0.67:1.0, or 0.77:1.0 and independently preferably is not more than, with increasing preference in the order given, 10:1.0, 6.7:1.0, 5.0:1.0, 3.3:1.0, 2.7:1.0, 2.0:1.0, 1.7:1.0, 1.3:1.0, 1.00:1.0, 0.90:1.0, 0.84:1.0, or 0.78:1.0.

Components (D) and (E) are generally not needed and thus are usually preferably omitted; however, one or both may be useful in some cases as a solubilizing agent (alternatively called "hydrotrope"). If any such component is used, it preferably has low volatility, to minimize storage instability and any possibility of an odor nuisance.

A working composition according to the invention preferably has the above noted components present in amounts that are at least, with increasing preference in the order given, 0.0010, 0.0030, 0.0050, 0.0070, 0.0090, 0.011, 0.013, 0.015, 0.017, 0.020, 0.025, 0.030, 0.035, 0.040, 0.045, 0.050, 0.055, or 0.060 times the preferred concentrations shown above for the corresponding component in concentrated compositions according to the invention. Independently, primarily for reasons of economy, such a working composition according to the invention preferably has the above noted components present in amounts that are not more than, with increasing preference in the order given, 0.20, 0.17, 0.15, 0.13, 0.120, 0.115, 0.110, 0.105, 0.095, 0.085, 0.080, 0.075, 0.070, or 0.065 times the preferred concentrations shown above for the corresponding component in concentrated compositions according to the invention.

In a process according to the invention, contact between the metal surface to be treated and a composition according to the invention may be accomplished by spraying, immersion, or any other convenient method or combination of methods; immersion is usually preferred, especially if the shape of the surface is so complex as to make it difficult to deliver approximately equal volumes of composition according to the invention to each unit area of the surface by any other method.

The blemish spots formed when this invention is not used have been found to be enriched in iron, compared to an unblemished part of the same glossy surface, so that it is hypothesized, without any limitation of the invention, that at least part of the effectiveness of the invention is due to more efficient removal of iron from a wet autodeposited coating treated with a composition according to the invention than with previously used rinsing compositions. Whether or not this is the actual reason, mechanical agitation during contact between a composition according to the invention and a wet autodeposited coating immersed therein is preferred; the degree of agitation is generally the same as known to those skilled in the art for other "reaction rinses"[3] used with wet autodeposited coatings.

[3] I.e., rinses with any liquid other than substantially pure water.

The temperature during contact between a wet autodeposited coating being treated and a composition according to the invention preferably is at least, with increasing preference in the order given, 15°, 18°, 20°, 22°, or 24 ° C. Ordinarily no advantage is achieved by a temperature greater than a normal human comfort ambient temperature, so that, at least for reasons of economy, the temperature during contact preferably is not more than, with increasing preference in the order given, 75°, 60°, 50°, 40°, 35°, or 30° C. The time of contact preferably is at least, 0.05, 0.10, 0.15, 0.20, 0.25, 0.30, 0.35, 0.40, 0.50, 0.55, 0.60, 0.65, 0.70, 0.75, 0.80, 0.85, 0.90, or 0.95 minutes (hereinafter usually abbreviated as "min"). Because no improvement in quality has been found for longer contact times, for reasons of economy the contact time independently preferably is not more than, with increasing preference in the order given, 10, 7, 5, 4.0, 3.0, 2.0, 1.5, or 1.1 min.

Preferably, a wet freshly formed autodeposited coating that is to be treated according to the invention is not allowed to dry to any larger extent than the practical minimum forced by the requirement to move the wet coating from one place where it is in contact with an autodepositing composition to another place where it is not. If the distance between the place where the wet autodeposited coating is formed and the place where it is treated according to the invention is large, transport between these two places is slow, or for any other reason the substrates being treated otherwise would be likely to dry substanistially during transfer, it is preferred to keep the atmosphere around the wet autodeposited coating at 100% relative humidity, for example, with a water misting device.

As with most other reaction rinses known in the autodeposition art, normally it is highly preferred to rinse still wet autodeposited coatings that have been treated with a composition according to the invention with deionized or at least equally purified water before allowing the coatings to dry or be further heated for any reason. It may also be advantageous in some instances to rinse wet autodeposited coatings to be treated according to the invention with water after they are removed from contact with the autodeposition composition from which the wet autodeposited coating was formed and before rinsing with a composition according to this invention. For such an intermediate rinse, ordinary tap water may be as satisfactory as deionized or other specially purified water, and when such an intermediate rinse is used, fully satisfactory results may be achieved, even if rinsing after the treatment according to this invention is omitted.

Preferred methods of generating wet autodeposited coatings for treatment according to this invention and of drying and curing the coatings after such treatment and, preferably, subsequent rinsing, are described in Example 1 of U.S. Pat. No. 4,800,106.

Further appreciation of the present invention may be had from considering the following examples and comparison examples which are intended to illustrate, but not to limit, the invention.

EXAMPLES AND COMPARISON EXAMPLES

Group 1

A preferred concentrate composition according to the invention contained the following components in the amounts shown:

| Parts by Weight | Material |
| --- | --- |
| 258 | 45% aqueous solution of potassium hydroxide |
| 92 | TEGO BETAINE ™ L-10 |
| 27.8 | 50% aqueous solution of gluconic acid |
| 21.5 | 99% pure triethanolamine; | the balance to a total of 1000 parts was deionized water. TEGO BETAINE™ L-10 was obtained commercially from Goldschmidt and is reported by its supplier to be an aqueous solution containing about 30 % of a mixture of surfactants with structures according to one of the two structural formulas shown in column 3 lines 23–49 of U.S. Pat. No. 4,800,106, except that "R" represents a lauryl (i.e., a straight chain $C_{12}H_{25}$) moiety rather than a moiety derived from natural coconut oil, along with about 5 % of sodium chloride.

Wet autodeposited coatings prepared as described in Example 1 of U.S. Pat. No. 4,800,106 were prepared, immersed at ambient temperature for 1.0 minute in a solution made by dissolving the concentrate according to the invention described in the immediately preceding paragraph in water to produce a solution containing 6.0 % of concentrate, rinsed with deionized water, and finally dried and cured by heating for 20 min in an oven maintained at 100° C. Consistently glossy and spot-free surfaces of the dried and cured autodeposited coatings were obtained.

When this treatment according to the invention was replaced by an identical process, except that the gluconic acid and triethanolamine were omitted from the composition in which the wet autodeposited coating was first immersed after its removal from contact with the autodeposition bath itself, the surfaces obtained on the dried and cured autodeposited coatings were glossy but contained numerous readily visible, less glossy, whitish-to-grayish, spots.

Group 2

A concentrate according to the invention prepared for this group contained the following components in the amounts shown:

| Parts by Weight | Material |
| --- | --- |
| 16.6 | 45% aqueous solution of potassium hydroxide |
| 6.0 | FOAM TAINE ™ CAB-A |
| 1.9 | 50% aqueous solution of gluconic acid |
| 1.7 | 99% pure triethanolamine; |
| 1.1 | caprylic acid; | the balance to a total of 40.0 parts was deionized water. FOAM TAINE™ CAB-A was obtained from ALZO, Inc. and was reported by its supplier to have the same general chemical composition as described above for TEGO BETAINE™L-10, except that it contained ammonium chloride instead of the sodium chloride in TEGO BETAINE™L-10.

Wet autodeposited coatings prepared as described in Example 1 of U.S. Pat. No. 4,800,106 were prepared, immersed at ambient temperature for 1.0 minute in a solution made by dissolving the concentrate according to the invention described in the immediately preceding paragraph in water to produce a solution containing 40 grams of concentrate per liter of solution, rinsed with deionized water, and finally dried and cured by heating for 20 min in an oven maintained at 100° C. Consistently glossy and spot-free surfaces of the dried and cured autodeposited coatings were obtained, but some of the surfaces were slightly streaked. When an otherwise identical experiment with a working composition containing only 20 grams per liter of the concentrate was done, however, the surfaces produced were less glossy.

What is claimed is:

1. A process for producing a glossy coating on a metal substrate by autodeposition thereon, said process comprising steps of:
    (I) contacting a wet autodeposited coating on the metal substrate, said wet autodeposited coating comprising iron cations with a volume of an aqueous liquid composition comprising water and:
        (A) an amount of a component of dissolved alkaline material, this alkaline material having a stoichiometric equivalent as hydroxide ions and the amount of this component being measured by a unit, which is abbreviated hereinafter as "M/kg", of number of moles of the stoichiometric equivalent as hydroxide ions per kilogram of the volume of aqueous liquid composition;
        (B) an amount of a component of amphoteric, zwitterionic, or both amphoteric and zwitterionic surfactant molecules, exclusive of any that constitute part of component (A), the amount of component (B) being measured by a unit, which is abbreviated hereinafter as "g/kg", of grams of the component per kilogram of total composition; and
        (C) an amount of a component of dissolved molecules that are complexing agents for ferrous ions, ferric ions, or both but are not part of the previously recited amounts of components (A) and (B), said complexing agents being selected from the group consisting of organic molecules that comprise both (1) at least one hydroxyl moiety and (2) at least one additional moiety selected from the group consisting of hydroxyl, carboxyl, carboxylate, and amino moieties, moieties (1) and (2) being present in said organic molecules in positions such that an oxygen atom in hydroxyl moiety (1) and an amino nitrogen atom or a non-carbonyl oxygen atom in moiety (2) can, together with the other atoms of the organic molecule and a metal atom to which said oxygen atom in hydroxyl moiety (1) and said amino nitrogen atom or non-carbonyl oxygen atom in moiety (2) are coordinately bonded, form a five- or six-atom-membered ring, the amount of component (C) being measured in g/kg;
    (II) maintaining the contacting established in step (I) for a sufficient time to transfer some of the iron cations from said wet autodeposited coating into said aqueous liquid composition; and
    (III) thereafter separating said wet autodeposited coating from said volume of said aqueous liquid composition.

2. A process according to claim 1, wherein, in said aqueous liquid composition: the amount of component (A) is from about 0.04 to about 0.6 M/kg; the amount of component (B), measured in g/kg, has a ratio to the amount of component (A), measured in M/kg, that is from about 1.5:1.0 to about 60:1.0; the amount of component (C)

includes at least one of an amount of a subcomponent (C.1) selected from the group consisting of hydroxy acids, their salts, and lactones that readily hydrolyze in water to produce hydroxy acids and an amount of a subcomponent (C.2) selected from the group consisting of amines that conform to the general formula $NR'_x(C_yH_{2y}OH)_{3-x}$, where R' represents a hydrogen moiety or alkyl moiety, x represents an integer from 0 to 2; y represents a positive integer that may be the same or different from one $C_yH_{2y}OH$ moiety to another and is not more than 4 the amounts of each of subcomponents (C.1) and (C.2) being measured in g/kg; the amount of subcomponent (C.1), if that subcomponent is present in the composition, has a ratio to the amount of component (B), expressed in the same units as the amount of subcomponent (C.1),] that is from about 0.050:1.0 to about 3.3:1.0; and the amount of subcomponent (C.2), if that subcomponent is present in the composition, has a ratio to the amount of component (B) that is from about 0.067:1.0 to about 10:1.0.

3. A process according to claim 2, wherein component (A) is selected from the group consisting of ammonium and alkali metal hydroxides and component (B) is selected from the group consisting of molecules conforming to one of the following two general chemical formulas

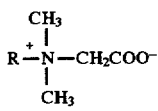

and amidobetaine having the empirical formula

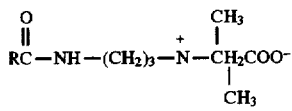

where, in each said formula, R, which may be the same or different from one molecule to another within the group, represents an aliphatic monovalent hydrocarbon moiety that may be saturated or unsaturated, that may be branched or straight chain, and that has a number of carbon atoms from 3 to 30.

4. A process according to claim 3, wherein said aqueous liquid composition has a pH value from about 10.0 to about 13.0 and, in said aqueous liquid composition: the amount of component (A) is from about 0.08 to about 0.30 M/kg; the amount of component (B) has a ratio to the amount of component (A) that is from about 5.0:1.0 to about 24:1.0; component (C) includes at least one of a subcomponent (C.1) selected from the group consisting of hydroxy acids, their salts, and lactones that readily hydrolyze in water to produce hydroxy acids and a subcomponent (C.2) selected from the group consisting of amines that conform to the general formula $NR'_x(C_yH_{2y}OH)_{3-x}$, where R' represents a hydrogen moiety or alkyl moiety, x represents an integer from 0 to 1; y represents a positive integer that may be the same or different from one $C_yH_{2y}OH$ moiety to another and is not more than 3; the amount of subcomponent (C.1), if that subcomponent is present in the composition, has a ratio to the amount of component (B) that is from about 0.15:1.0 to about 1.35:1.0; and the amount of subcomponent (C.2), if that subcomponent is present in the composition, has a ratio to the amount of component (B) that is from about 0.27:1.0 to about 2.0:1.0.

5. A process according to claim 4, wherein component (A) is selected from the group consisting of sodium and potassium hydroxides and component (B) is selected from the group consisting of molecules conforming to one of said two general chemical formulas and said number of carbon atoms is from 10 to 22.

6. A process according to claim 5, wherein said aqueous liquid composition has a pH value from about 11.0 to about 12.5 and, in said aqueous liquid composition: the amount of component (A) is from about 0.12 to about 0.22 M/kg; the amount of component (B) has a ratio to the amount of component (A), measured in M/kg, that is from about 12.0:1.0 to about 17:1.0; component (C) includes at least one of a subcomponent (C.1) selected from the group consisting of gluconic acid, heptogluconic acid, citric acid, tartaric acid, malic acid, salts of all of these acids, and glucono-delta-lactone and a subcomponent (C.2) selected from the group consisting of amines that conform to the general formula $N(C_yH_{2y}OH)_3$, where y represents a positive integer that may be the same or different from one $C_yH_{2y}OH$ moiety to another and is not more than 3; the amount of subcomponent (C.1), if that subcomponent is present in the composition, has a ratio to the amount of component (B) that is from about 0.40:1.0 to about 0.75:1.0; and the amount of subcomponent (C.2), if that subcomponent is present in the composition, has a ratio to the amount of component (B) that is from about 0.60:1.0 to about 1.3:1.0.

7. A process according to claim 6, wherein said aqueous liquid composition has a pH value from about 11.6 to about 12.3 and, in said aqueous liquid composition component (A) is potassium hydroxide and component (C) includes both a subcomponent (C.1) selected from the group consisting of gluconic acid, its salts, and glucono-delta-lactone and a subcomponent (C.2) of triethanolamine.

8. A process according to claim 7, wherein: said wet autodeposited coating has been formed from an autodepositing composition consisting essentially of particles of resin dispersed in an aqueous solution consisting essentially of (i) water, (ii) hydrofluoric acid, and (iii) ferric ions, hydrogen peroxide, or both; said resin is a polymer of a mixture of monomers consisting of (i) from about 50 to about 99% of vinylidene chloride, (ii) from about 0.5 to about 5% of an internal stabilizing monomer conforming to the general formula $R'''{-}Z{-}Q{-}(SO_3)^-M^{3\oplus}$, wherein "R'''" represents a moiety selected from the group consisting of vinyl and alkyl-substituted vinyl, "Z" represents a difunctional linking group which will activate the double bond in the vinyl group, "—Q—" represents a divalent hydrocarbon moiety having its valence bonds on different carbon atoms, and "M$^+$" represents a cation, and, optionally, (iii) from about 5 to about 50% of one or more substances selected from the group consisting of vinyl chloride, acrylic acid, methyl acrylate, ethyl acrylate, butyl acrylate, methacrylic acid, methyl methacrylate, acrylonitrile, methacrylonitrile, acrylamide, and methacrylamide; and contacting during step (II) of the process is for a time from about 0.80 to about 1.5 min.

9. A process according to claim 6, wherein: said wet autodeposited coating has been formed from an autodepositing composition consisting essentially of particles of resin dispersed in an aqueous solution consisting essentially of (i) water, (ii) hydrofluoric acid, and (iii) ferric ions, hydrogen peroxide, or both; said resin is a polymer of a mixture of monomers consisting of (i) from about 50 to about 99% of vinylidene chloride, (ii) from about 0.5 to about 5% of an internal stabilizing monomer conforming to the general formula $R'''{-}Z{-}Q{-}(SO_3)^{-M+}$, wherein "R'''" represents a moiety selected from the group consisting of vinyl and alkyl-substituted vinyl, "Z" represents a difunctional linking group which will activate the double bond in the vinyl group, "—Q—" represents a divalent hydrocarbon moiety having its valence bonds on different carbon atoms, and "M⁺" represents a cation, and, optionally, (iii) from about 5 to about 50% of one or more substances selected from the group consisting of vinyl chloride, acrylic acid, methyl acrylate, ethyl acrylate, butyl acrylate, methacrylic acid, methyl methacrylate, acrylonitrile, methacrylonitrile, acrylamide, and methacrylamide; and contacting during step (II) of the process is for a time of at least about 0.60 min.

10. A process according to claim 5, wherein: said wet autodeposited coating has been formed from an autodepositing composition comprising an internally or externally stabilized dispersion of a copolymer of vinylidene chloride with other monomers, vinylidene chloride residues constituting more than 50% of the total copolymer.

11. A process according to claim 4, wherein: said wet autodeposited coating has been formed from an autodepositing composition comprising an internally or externally stabilized dispersion of a copolymer of vinylidene chloride with other monomers, vinylidene chloride residues constituting more than 50% of the total copolymer.

12. A process according to claim 3, wherein: said wet autodeposited coating has been formed from an autodepositing composition comprising an internally or externally stabilized dispersion of a copolymer of vinylidene chloride with other monomers, vinylidene chloride residues constituting more than 50% of the total copolymer.

13. A process according to claim 2, wherein: said wet autodeposited coating has been formed from an autodepositing composition comprising an internally or externally stabilized dispersion of a copolymer of vinylidene chloride with other monomers, vinylidene chloride residues constituting more than 50% of the total copolymer.

14. A process according to claim 1, wherein: said wet autodeposited coating has been formed from an autodepositing composition comprising an internally or externally stabilized dispersion of a copolymer of vinylidene chloride with other monomers, vinylidene chloride residues constituting more than 50% of the total copolymer.

15. A concentrate composition suitable for dilution with water to form a gloss enhancing reaction rinse for a wet autodeposited coating, said composition comprising:
  (A) an amount of a component of dissolved alkaline material, this alkaline material having a stoichiometric equivalent as hydroxide ions and the amount of this component being measured by a unit, which is abbreviated hereinafter as "M/kg", of number of moles of the stoichiometric equivalent as hydroxide ions per kilogram of the concentrate composition;
  (B) an amount of a component of amphoteric and/or zwitterionic surfactant molecules, exclusive of any that constitute part of component (A), the amount of component (B) being measured by a unit, which is abbreviated hereinafter as "g/kg", of grams of the component per kilogram of total composition; and
  (C) an amount of a component of dissolved molecules that are complexing agents for ferrous and/or ferric ions but are not part of one of the previously recited components, said complexing agents being selected from the group consisting of organic molecules that comprise both (1) at least one hydroxyl moiety and (2) at least one additional moiety selected from the group consisting of hydroxyl, carboxyl, carboxylate, and amino moieties, moieties (1) and (2) being present in said organic molecules in positions such that the oxygen atom in hydroxyl moiety (1) and the amino nitrogen atom or a noncarbonyl oxygen atom in moiety (2) can, together with the other atoms of the organic molecule and a metal atom to which said oxygen atom in hydroxyl moiety (1) and said amino nitrogen atom or non-carbonyl oxygen atom in moiety (2) are coordinatively bonded, form a five- or six-atom-membered ring, the amount of component (C) being measured in g/kg.

16. A composition according to claim 15, wherein: the amount of component (A) is from about 0.40 to about 3.0 M/kg; the amount of component (B) has a ratio to the amount of component (A) that is from about 3.0:1.0 to about 30:1.0; component (C) includes at least one of a subcomponent (C.1) selected from the group consisting of hydroxy acids, their salts, and lactones that readily hydrolyze in water to produce hydroxy acids and a subcomponent (C.2) selected from the group consisting of amines that conform to the general formula $NR'_x(C_yH_{2y}OH)_{3-x}$, where R' represents a hydrogen moiety or alkyl moiety, x represents an integer from 0 to 2; y represents a positive integer that may be the same or different from one $C_yH_{2y}OH$ moiety to another and is not more than 4, the amounts of each of subcomponents (C.1) and (C.2) being measured in g/kg; the amount of subcomponent (C.1), if that subcomponent is present in the composition, has a ratio to the amount of component (B) that is from about 0.050:1.0 to about 3.3:1.0; and the amount of subcomponent (C.2), if that subcomponent is present in the composition, has a ratio to the amount of component (B) that is from about 0.067:1.0 to about 10:1.0.

17. A composition according to claim 16, wherein component (A) is selected from the group consisting of ammonium and alkali metal hydroxides and component (B) is selected from the group consisting of molecules conforming to one of the following two chemical general formulas

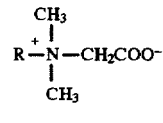

and

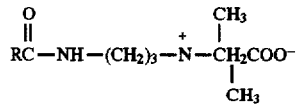

where, in each said formula, R, which may be the same or different from one molecule to another within the group, represents an aliphatic monovalent hydrocarbon moiety that may be saturated or unsaturated, that may be branched or straight chain, and that has a number of carbon atoms from 8 to 30.

18. A composition according to claim 17, wherein: the amount of component (B) has a ratio to the amount of component (A) that is from about 5.0:1.0 to about 24:1.0; component (C) includes at least one of a subcomponent (C.1) selected from the group consisting of hydroxy acids, their salts, and lactones that readily hydrolyze in water to produce hydroxy acids and a subcomponent (C.2) selected from the group consisting of amines that conform to the general formula $NR'_x(C_yH_{2y}OH)_{3-x}$, where R' represents a hydrogen moiety or alkyl moiety, x represents an integer from 0 to 1; y represents a positive integer that may be the same or different from one $C_yH_{2y}OH$ moiety to another and is not more than 3; the amount of subcomponent (C.1), if that subcomponent is present in the composition, has a ratio to the amount of component (B) that is from about 0.15:1.0 to about 1.35:1.0; and the amount of subcomponent (C.2), if that subcomponent is present in the composition, has a ratio to the amount of component (B) that is from about 0.27:1.0 to about 2.0:1.0.

19. A composition according to claim 18, wherein: component (A) is selected from the group consisting of sodium and potassium hydroxides and component (B) is selected so that said number of carbon atoms is from 10 to 22; the amount of component (B), measured in g/kg, has a ratio to the amount of component (A), measured in M/kg, that is from about 12.0:1.0 to about 17:1.0; component (C) includes at least one of a subcomponent (C.1) selected from the group consisting of gluconic acid, heptogluconic acid, citric acid, tartaric acid, malic acid, salts of all of these acids, and glucono-delta-lactone and a subcomponent (C.2) selected from the group consisting of amines that conform to the general formula $N(C_yH_{2y}OH)_3$, where y represents a positive integer that may be the same or different from one $C_yH_{2y}OH$ moiety to another and is not more than 3; the amount of subcomponent (C.1), if that subcomponent is present in the composition, has a ratio to the amount of component (B) that is from about 0.40:1.0 to about 0.75:1.0; and the amount of subcomponent (C.2), if that subcomponent is present in the composition, has a ratio to the amount of component (B) that is from about 0.60:1.0 to about 1.3:1.0.

20. A composition according to claim 19, wherein component (A) is potassium hydroxide and component (C) includes both a subcomponent (C.1) selected from the group consisting of gluconic acid, its salts, and glucono-delta-lactone and subcomponent C.2) of triethanolamine.

\* \* \* \* \*